United States Patent
Suzuki et al.

(10) Patent No.: US 7,006,475 B1
(45) Date of Patent: Feb. 28, 2006

(54) MOBILE COMMUNICATION METHOD USING CDMA MULTIPLEXING TECHNIQUE AND MOBILE COMMUNICATION SYSTEM

(75) Inventors: Toshiro Suzuki, Yokohama (JP); Takashi Yano, Kokubunji (JP); Takaki Uta, Kokubunji (JP); Katsuhiko Tsunehara, Kokubunji (JP); Hisato Iwai, Tokyo (JP)

(73) Assignees: Hitachi, Ltd., Tokyo (JP); KDDI Corporation, Tokyo (JP)

( * ) Notice: Subject to any disclaimer, the term of this patent is extended or adjusted under 35 U.S.C. 154(b) by 0 days.

(21) Appl. No.: 09/786,685

(22) PCT Filed: Dec. 21, 1999

(86) PCT No.: PCT/JP99/07175

§ 371 (c)(1),
(2), (4) Date: May 18, 2001

(87) PCT Pub. No.: WO00/38450

PCT Pub. Date: Jun. 29, 2000

(30) Foreign Application Priority Data

Dec. 21, 1998 (JP) .................................. 10-362862

(51) Int. Cl.
*H04B 7/216* (2006.01)
(52) U.S. Cl. ...................................... 370/335; 370/342
(58) Field of Classification Search .................. None
See application file for complete search history.

(56) References Cited

U.S. PATENT DOCUMENTS 5,515,378 A * 5/1996 Roy et al. .................... 370/334
6,782,035 B1 * 8/2004 Nakamura et al. ........... 375/130

FOREIGN PATENT DOCUMENTS

JP         9271071      10/1997
JP         10126331      5/1998

OTHER PUBLICATIONS

K. Higuchi, "Two-Stage Rapid Long Code Acquisition Scheme in DS-CDMA Asynchronous Cellular System" NTT Mobile Communications Network Inc., The Institute of Electronics Information and Communication Engineers, Technical Report of IEICE CS96-19 (May 1996), pp. 27-32.

* cited by examiner

*Primary Examiner*—Huy D. Vu
*Assistant Examiner*—Cynthia L. Davis
(74) *Attorney, Agent, or Firm*—Mattingly, Stanger, Malur & Brundidge, P.C.

(57) ABSTRACT

On the side of a mobile station, interference of a perch channel with call control information or a traffic channel is reduced, realizing stable communication. In a method of CDMA communication in which communication is made through the traffic channel for transmitting user data and the perch channel for transmitting a spreading code used for demodulation of the user data, the traffic channel has a call control channel subjected to the time division multiplex, and that call control channel and a part of the perch channel, which is non-orthogonal to the call control channel, are arranged not to overlap with each other in a time base.

9 Claims, 8 Drawing Sheets

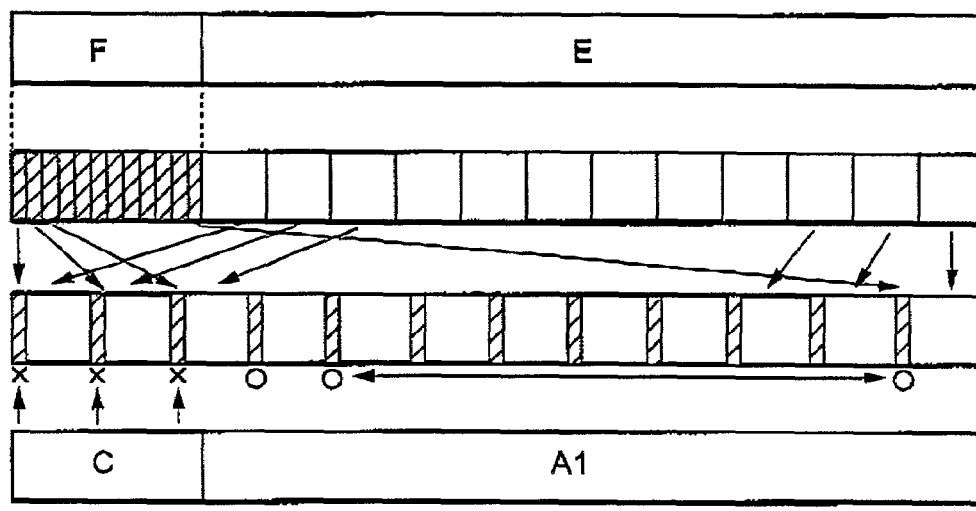

FIG.11

| | | | | | |
|---|---|---|---|---|---|
| FIRST PERCH CHANNE | C(O2) | A1(C1·D1) | C | A1 | C |
| SECOND PERCH CHANNEL | D(O3) | | D | | D |
| TRAFFIC CHANNEL | F(Cn·D1) | E(Cn·D1) | F | E | F |

MOBILE COMMUNICATION METHOD USING CDMA MULTIPLEXING TECHNIQUE AND MOBILE COMMUNICATION SYSTEM

TECHNICAL FIELD

The present invention relates to a method of mobile communication using CDMA (Code Division Multiple Access) technique, and in particular to a method of mobile communication using a CDMA multiplexing technique that can prevent disturbance to a call control signal owing to inevitable interference between signals emitted from a base station being multiplexed according to the CDMA system.

BACKGROUND ART

In the CDMA system, on the transmission side, radio channels are each subjected to code modulation using a spreading code specific to each radio channel, then multiplexed, and transmitted, and the receiving side demultiplexes each channel by decoding operation called despreading using a code specific to that radio channel. To this end, the receiving side should perform despreading using the identical spreading code and on the same timing as the transmission side. Generally, in a mobile communication system, a different spreading code is used for each call connection, and accordingly, it is necessary to previously inform the receiving side of a spreading code to use.

Thus, the CDMA mobile communication system sets a broadcast channel called a perch channel, in addition to a channel through which user data for communication is transmitted, and uses this perch channel for transmitting code information required for despreading. This perch channel and the other channels (a control channel, a traffic channel, etc.) are subjected to code modulation using respective spreading codes orthogonal to one another to separate those channels. Those spreading codes for channel separation are characteristic to the system and therefore known to mobile stations (MS). Here, the perch channel is a broadcast channel for transmitting common control information to a plurality of mobile stations.

On the other hand, in the CDMA system, it is required that a mobile station distinguishes each base station (BS). Each base station spreads the perch channel with a spreading code unique to that base station, to transmit the perch channel. Namely the perch channel is subject to spreading twice, once with the spreading code for the channel separation, and once with a spreading code for distinguishing a base station. Differently from the spread code for channel separation, this spreading code for distinguishing a base station is unknown to a mobile station. Accordingly, a mobile station must try and find whether a spreading code for distinguishing a base station coincides with one of a plurality of candidates, one by one.

FIG. 9 is a diagram for explaining a perch channel signal system according to the above-mentioned conventional technique, and now it will be described furthermore. In FIG. 9, the symbol A indicates one slot of the perch channel, and the symbol B indicates one slot of the traffic channel. The perch channel transmits codes used by a mobile station for despreading, and the traffic channel transmits a user traffic such as a call traffic and data traffic. Each slot A of the perch channel is subjected to code modulation twice, once with a short code C1 unique to the system and common to every base station within the system, and once with a long code D1 unique to a particular bane station.

The perch channel and a group of essential traffic channels (a plurality of traffic channels exist correspondingly to the number of mobile stations under communication) transmitted by the base station at the same time are each spread with spreading codes orthogonal to one another to avoid mutual interference. On the other hand, the system structure becomes simple when the code D1 unique to a particular base station is common for all the traffic channels emitted from that particular base station. Thus, each slot B of the traffic channels other than the perch channel emitted from the same base station is subjected to spreading twice, once with a short code CN that is orthogonal to and different from the short code C1 that is unique to the system and used for the perch channel, and once with the long code D1 that is same as the perch channel and unique to a particular base station. By using CN that is orthogonal to C1 in terms of a code, it is possible to ensure orthogonality between the perch channel and traffic channels.

However, in the above-described example, since the code D1 unique to a base station is not previously informed to a mobile station, a mobile station must try all the codes that can be considered in principle, to search out the correct code. In this method, when the number of kinds of those codes is enormous, or when the code length of those codes is extremely long, much time is required for searching out the correct code.

Thus, it is possible to consider a method where the codes assigned to the base stations are classified into some groups in advance, and classification information is transmitted in advance. In this case, there is known a method of shortening the search time, in which a mobile station first detects the group to which the required code belongs, to narrow the range of search objects, and then, searches the codes within that group.

Further, in order to perform despreading with a long code D1 unique to a base station, it is necessary to know the time (timing of the code) at which despreading is started using that code. However, in the example shown in FIG. 9, it is impossible to know the start time before identifying the code D1, which is a problem to solve.

FIG. 10 is a diagram for explaining a perch channel signal system according to another conventional technique that can solve the above-mentioned problem, and it will be described in the following.

The example shown in FIG. 10 uses two kinds of perch channels, i.e., first and second perch channels, as the perch channel. Each slot of the first perch channel comprises an area A1 and an area C. Similarly to the case of FIG. 9, the area A1 is subjected to code modulation twice, once with the short code C1 unique to the system and common to every base station within the system and once with the long code D1 unique to a particular base station. And, the area C is subjected to spreading with a spreading code different from those codes. At this area C, spreading with the long spreading code D1 and the spreading with the short spreading code C1 unique to the system are stopped, and instead, this area C is spread with a short spreading code O2.

This spreading code O2 is used for clarifying the send timing of the perch channel, and a mobile station can realize slot synchronization of the perch channel, by receiving the area C. Namely, the mobile station can know the time at which the long spreading code D1 started. Further, a code predetermined by the system can be used as the spreading code O2, similarly to the spreading code C1, and, in order for a mobile station to easily establish slot synchronization, a special code having a small correlation is used.

Further, in the second perch channel, an area D is set at a time position that is synchronous with the area C of the first perch channel. This area D is spread with a short spreading code O3 that indicates a class (group) to which the long spreading code D1 unique to the base station belongs. Here, the codes O2 and O3 have orthogonal relation with each other, and therefore, can be separated even if they overlap in time base with each other. An interval between a certain area D and the next area D, namely, a part that is synchronous with an area A1 of the first perch channel, is made empty.

As the conventional technique concerning a mobile communication method using the above-described CDMA multiplexing technique, is known the technique described in HIGUCHI Ken-ichi, SAWAHASHI Mamoru and ADACHI Fumiyuki, "Method of high speed cell search using a long code mask in a DS-CDMA cellular system with asynchronous base stations", Shingakugiho, TECHNICAL REPORT OF IEICE DSP96–116, SAT96–111, RCS96–122 (1997–01), for example.

In the above-described conventional technique shown in FIG. 10, the long spreading code D1 is not used for spreading in the areas C and D of the first and second perch channels, and, the short spreading codes O2 and O3 are not necessarily orthogonal to the spreading code C1. Accordingly, the parts of the areas C and D are not orthogonal to communication channels other than the perch channels. Accordingly, it is possible that, in the above-described conventional technique, signals in the parts of the areas C and D of the first and second perch channel interferes with the communication channels, causing interference similar to white noise.

Owing to the mentioned interference, partial noise is mixed onto a signal on the essential traffic channel. Generally, however, by sufficient interleaving in the traffic channel, a partial error is not made and a severe problem does not occur as a result of averaging.

However, a general traffic channel is multiplexed with call control information for ring trip, handover, call termination, and the like. Thus, when the above-mentioned area C or D overlaps in time base with an area of the call control information, severe interference is given to the call control information.

FIG. 11 is a diagram for explaining that the areas C and D give interference to the call control information on the traffic channel, and it will be described in the following.

In FIG. 11, the first and second perch channels have the same structures as ones described referring to FIG. 10. The traffic channel for an essential user signal has areas F for transmitting the call control information used for ring trip, handover, call termination, and the like, in addition to areas E for transmitting essential signal information. Here, the areas F–E are spread with the spreading codes CN and D1 as described above. The call control information requires a lower bit rate than the essential signal information, and accordingly, as shown in FIG. 11, the control information is time division multiplexed as the area F having shorter duration with the area E for transmitting the signal information. The length of one slot consisting of the area E for the traffic channel and the area F is same as the length of one slot consisting of the area A and the area C of the first perch channel, in terms of time duration.

Further, for the sake of convenience of description, FIG. 11 shows the case where the areas C and D of the first and second perch channels and the areas F of the traffic channel have completely synchronized timing. However, a different slot offset is set for a traffic channel of each mobile station, and it is possible that the area F partly overlaps with the areas C and D.

Thus, in the conventional technique shown in FIG. 10, when the areas C and D of the perch channel and the area F for transmitting the call control information overlap with each other, interference with the call control information is generated, as shown in FIG. 11. Generally, in the case of user information such as voice or data, generation of an occasional error does not invite fatal degradation of the service. On the other hand, it is an important problem that an error in the call control information invites unstableness of call connection and considerable degradation of the service. In particular, the area F for transmitting the call control information has shorter duration in comparison with the areas E and A1, the area F may entirely overlap with the areas C and D. Thus, when almost all the area F overlaps with the areas C and D, improvement in error can not be expected by interleaving the area F only.

SUMMARY OF THE INVENTION

An object of the present invention is to provide a method of CDMA mobile communication that can solve the problem of the technique shown in FIG. 11, can suppress interference of the area C (which is used for clarifying send timing of the perch channels) and the area D (which indicates a group of long spreading codes D1) in the first and second perch channel with the call control information on the traffic channel, can recovery the call control information when it is interfered, and can perform stable call connection.

To achieve the above objects, the present invention provides a method of mobile communication in which a base station communicate with a mobile station through a call control channel for transmitting call control information and through a perch channel for transmitting a spread code used for despreading demodulation of said call control information, wherein: said perch channel and said call control channel are transmitted being arranged in a time base such that an error rate becomes less than or equal to a threshold level when said mobile station receives said call control channel.

Further, the above objects are achieved by arranging said call control channel and a part that is provided in said perch channel and is not orthogonal to said call control channel in terms of a code, such that the error rate becomes less than or equal to the threshold level, when said call control channel is received, when said perch channel and said call control channel are arranged in the time base.

Further, the above objects are achieved by interleaving said call control channel when said perch channel and said call control channel are arranged.

Further, the above objects are achieved by providing a method of mobile communication in which a base station communicate with a mobile station through a call control channel for transmitting call control information and through a perch channel for transmitting a spread code used for despreading demodulation of said call control information, wherein: said perch channel and said call control channel are transmitted, being arranged in a time base such that said mobile station can demodulate said call control channel.

Further, the above objects are achieved by providing a method of mobile communication in which a base station communicate with a mobile station through a call control channel for transmitting call control information and through a perch channel for transmitting a spread code used for despreading demodulation of said call control information, wherein: said call control channel is transmitted, being power controlled such that said mobile station can demodulate said call control channel.

Further, the above objects are achieved by providing a radio base station comprising: a first channel generating part for spreading call control information with a first spreading code to generate a call control channel; a second channel generating part for generating a perch channel that transmits the first spreading code used for despreading modulation of said call control information: and a channel multiplexing part for multiplexing the call control channel generated by said first channel generating part and the perch channel generated by said second channel generating part by arranging the call control channel and the perch channel such that said call control channel can be demodulated.

Further, the above objects are achieved when said channel multiplexing part arranges, in a time base, said call control channel and said perch channel's part non-orthogonal in terms of a code to said call control channel, such that said call control channel can be demodulated when received.

Further, the above objects are achieved when said channel multiplexing part multiplexes said perch channel and the call control channel subjected to interleave.

Further, the above objects are achieved by further providing a control part for controlling transmit power of said call control channel, wherein said control part performs power control such that said call control channel can be demodulated.

Further, the above objects are achieved by providing a method of mobile communication using a CDMA multiplex technique, in which a base station communicates with a mobile station through a traffic channel for transmitting user data and through a perch channel for transmitting a spreading code used for demodulating the user data, wherein; said traffic channel has a call control channel subjected to time division multiplex; and said call control channel and a part that is provided in said perch channel and has not orthogonality to other channels in terms of the spreading code are arranged not to overlap with each other in a time base.

Further, the above objects are achieved by providing a method of mobile communication using a CDMA multiplex technique, in which a base station communicates with a mobile station through a traffic channel for transmitting user data and through a perch channel for transmitting a spreading code used for demodulating the user data, wherein: said traffic channel is constructed such that said traffic channel has a call control channel subjected to time division multiplex, and a signal of said call control channel and the user data are subjected to time division multiplex and interleaving.

Further, the above objects are achieved when said base station controls transmit powers of the perch channel and traffic channel to satisfy;

$$Pu >= Pp + SIRr - Gd$$

where Pu is a transmit power of said traffic channel, Pp is a transmit power of said perch channel, SIRr is a signal to interference power ratio required for receiving the traffic channel without an error, and Gd=10 log(spread rate/bit rate of the traffic channel) is a spread gain of the traffic channel. Further, the above objects are achieved by providing: a control information generating part for generating control information common to a plurality of radio terminal; a first spreading part for spreading said control information with a first spreading code D1; a second spreading part for spreading a first specific information with a second spreading code O2 related to a start timing of said first spreading code; a third spreading part for spreading the control information, which has been spread by said first spreading part, with a third spreading code C1; a first perch channel generating part for generating a first perch channel by performing time division multiplex with respect to the control information spread by said third spreading part and the specific information spread by said second spreading part; a fourth spreading part for spreading a second specific information with a fourth spreading code O3 (this O3 is in orthogonal relation with said O2 in terms of a code) related to a group to which said first spreading code belongs; a second perch channel generating part for generating a second perch channel by synchronizing the second specific information spread with the fourth spreading code O3 with said first specific information of said first perch channel: an input part for inputting voice or data; a call control information generating part for generating call control information; a multiplexing part for performing time division multiplex with respect to said voice or data and said call control information; a fifth spreading part for spreading said voice or data and call control information subjected to the time division multiplex, using said first spreading code D1; a sixth spreading part for spreading said voice or data and call control information, which have been subjected to spreading by said fifth spreading part, using a fifth spreading code CN orthogonal to said third spreading code in terms of a code; a traffic channel generating part for generating a traffic channel including said voice or data and call control information spread with said fifth spreading code; and a control part for controlling slot offsets of said first perch channel and said traffic channel, such that said first specific information of the first perch channel and said call control information of the traffic channel, generally, do not overlap with each other in a time base.

Here, instead of said control part or in addition to said control part, may be provided a transmit power control part for controlling a transmit power of said traffic channel.

Further, the above objects are achieved by providing an error correction coding part for performing error correction coding on said voice or data and said call control information, before spreading using said fifth spreading code CN.

Further, the above objects are achieved by providing: a multiplexing part for performing time division multiplex with respect to said voice or data and the call control information: an interleaving part for interleaving said voice or data and call control information subjected to said time division multiplex; and a fifth spreading part for spreading said voice or data and call control information subjected to interleaving, using said first spreading code D1;

Further, the above objects are achieved by providing an error correction coding part for performing error correction coding on said call control information before the interleaving.

Further, the above objects are achieved by providing an error correction coding part for performing error correction coding after said voice or data and said call control information are multiplexed, and before the interleaving.

Further, the above objects are achieved by providing a mobile station comprising: a receiving part for receiving said first perch channel, said second perch channel, and said traffic channel: a first extracting part for extracting said second spreading code O2 from the first perch channel receives by said receiving part, a second extracting part for extracting said fourth spreading code O3 from the second perch channel received by said receiving part; a third extracting part for extracting said first spreading code based on said second spreading code and said fourth spreading code; a broadcast information demodulating part for demodulating broadcast information by performing despreading demodulation on said second perch channel using said first spreading code extracted by said third extracting part and said third spreading code C1; and a call control information demodulating part for demodulating the call control information by performing despreading demodulation on said traffic channel using said first spreading code extracted by said third extracting part and said fifth spreading code CN.

BRIEF DESCRIPTION OF DRAWINGS

FIG. 8 is a diagram showing a state of interleave according to the present invention;

FIG. 9 is a diagram showing a conventional technique,

FIG. 10 is a diagram showing another conventional technique; and

FIG. 11 is a diagram showing the problem to be solved by the present invention.

DETAILED DESCRIPTION OF THE INVENTION

Figure 1:
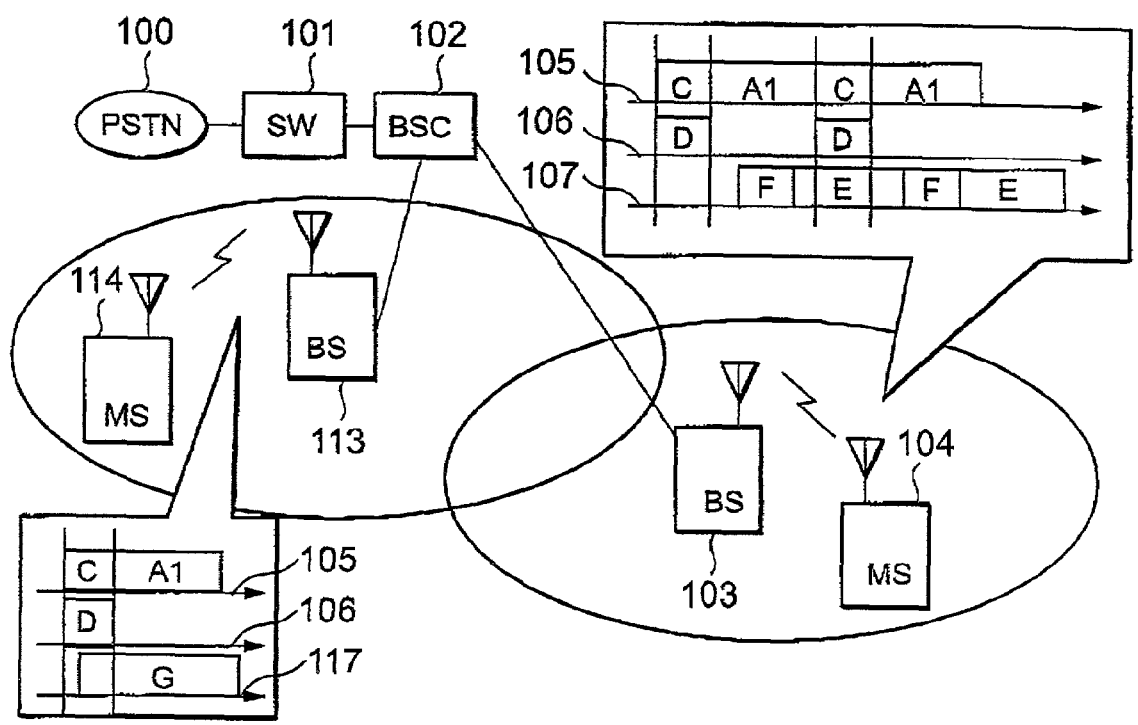
FIG. 1 is a diagram showing a configuration of a mobile communication system according to the present invention.

In the following, an embodiment of the method of mobile communication using the CDMA multiplexing technique according to the present invention will be described in detail referring to the drawings.

FIG. 1 shows a CDMA mobile communication system according to the present invention. This system comprises a public switched telephone network (PSTN) 100, a switching center (SW) 101, a base station control (BSC) 102 for controlling base stations, radio base stations 103, 113, and mobile stations 104, 114. Further, FIG. 1 shows a first perch channel 105, a second perch channel 106, a traffic channel 107 given with a suitable slot offset, and an interleaved traffic channel 117. Owing to thus-arranged traffic channel, it is possible to prevent an error of the call control information in the traffic channel.

1. First Embodiment

Figure 2:
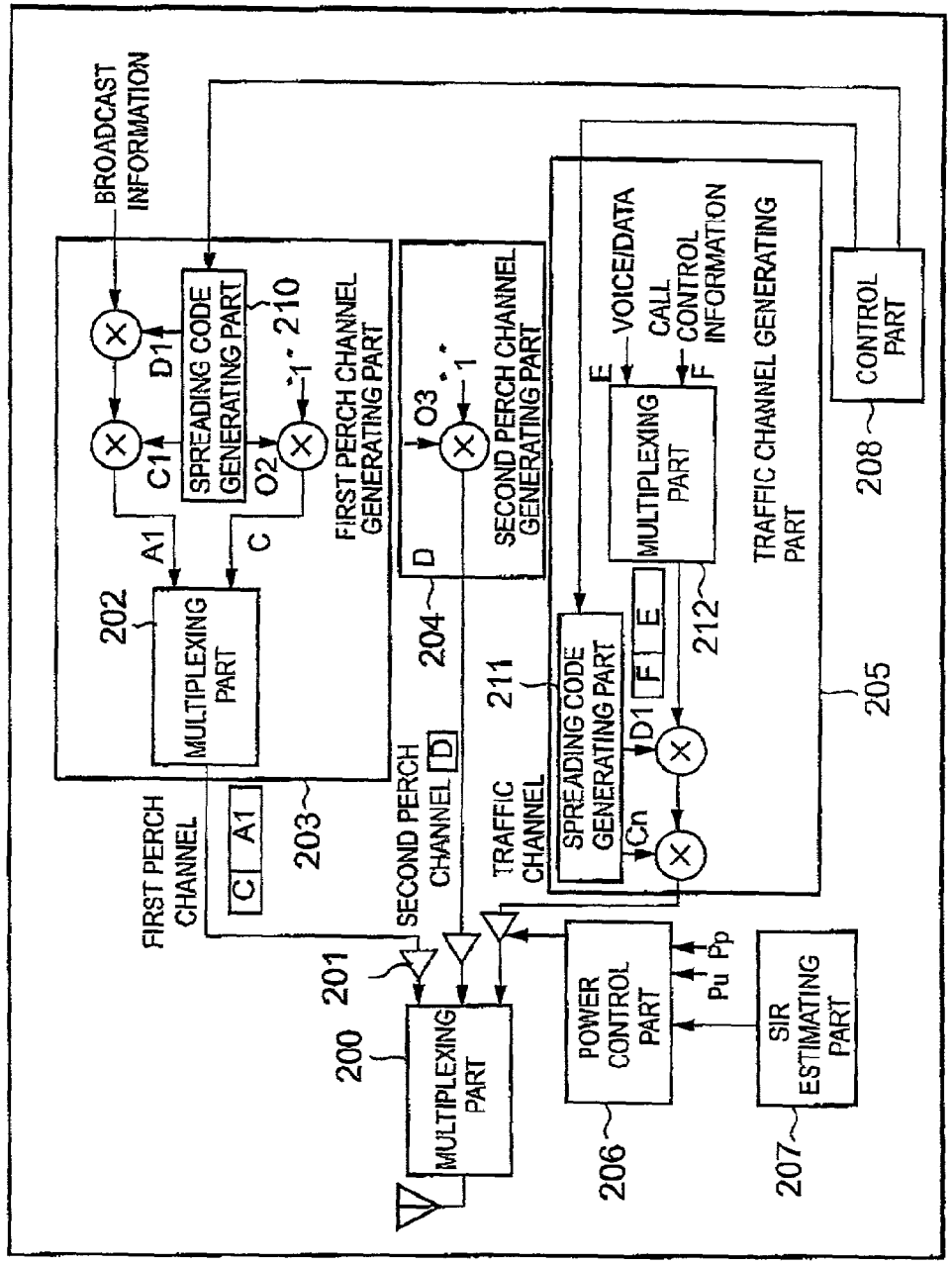
FIG. 2 is a block diagram showing a radio base station according to the present invention.
Figure 4:
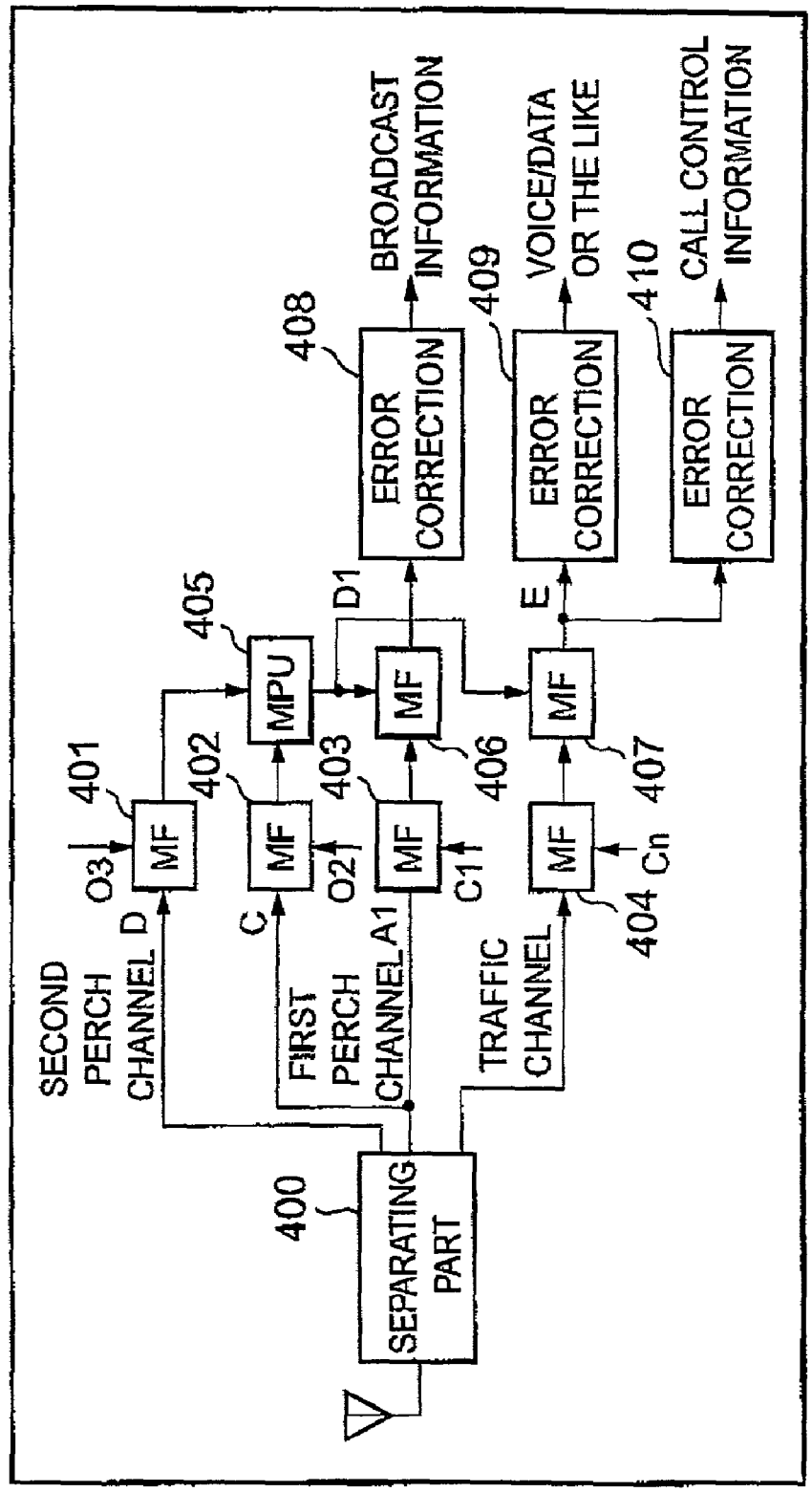
FIG. 4 is a block diagram showing a radio terminal according to the present invention.

FIG. 2 shows a radio base station 103 according to the first embodiment, and FIG. 4 shows a configuration of a mobile station 104 according to the first embodiment.

As shown in FIG. 2, the radio base station 103 comprises; a multiplexing part 200 for multiplexing and transmitting a first perch channel, a second perch channel, and a traffic channel; a first perch channel generating part 203; a second perch channel generating part 204; a traffic channel generating part 205; a power control part 206 for controlling power of the traffic channel; and an SIR (Signal to Interference Ratio) estimating part 207 for estimating an SIR of a received signal. In detail, the first perch channel generating part 203 performs spreading of broadcast information, which is control information common to a plurality of mobile stations, with a long spreading code D1 unique to the base station and a short spreading code C1 unique to the system. This makes an area A1. An area C is spread with a spreading code O2 indicating a start position of the spreading code D1. Here, the area C is all-1 data. Further, the spreading codes D1, C1 and O2 are generated by a spreading code generating part 210, and set to spreaders. The areas A1 and C after spreading are multiplexed by a multiplexing part 202. The second perch channel generating part 204 performs spreading with a spreading code O3 indicating a group to which the spreading code D1 belongs, to generate an area D. Here, the area D is all-1 data. The traffic channel generating part 205 comprises: a multiplexing part 212 for multiplexing communication information (an area E) such as voice or data and call control information (an area F) such as ring trip and the like; and a spreading code generating part 211 for generating spreading codes CN and D1 used for spreading the area FE after multiplexing. Here, a control part 208 controls the spreading code generating parts 210 and 211, and indicates a slot offset and the like, for example. Namely, the control part 208 sets slot offsets to the spreading code generating parts so that a serious error does not occur in the call control information. The spreading code generating parts 210 and 211 generate spreading codes with the slot offsets indicated by the control part 208.

As shown in FIG. 4, the mobile station 104 comprises: a separating part 400 for separating a received signal; a despreading part 401 for despreading the second perch channel to search the spreading code O3; a despreading part 402 for despreading the area C of the first perch channel to search the spreading code O2; a despreading part 403 for despreading the area A1 of the first perch channel with the spreading code C1; a despreading part 406 for despreading the area that has been despread with the spreading code C1 by the despreading part 403, in accordance with an instruction of a control part 405, in order to search the long spreading code D1; a despreading part 404 for despreading the traffic channel with the short spreading code CN; a despreading part 407 for despreading the traffic channel, which has been despread with the spreading code CN by the despreading part 404, with the long spreading code D1 obtained from the first perch channel; an error correcting part 408 for performing error correction of the broadcast information that has been demodulated by despreading; an error correcting part 409 for performing error correction of the communication information such as voice or data that has been demodulated by despreading; and an error correcting part 410 for performing error correction of the call control information that has been demodulated by despreading. Now, receiving operation will be described. First, when the despreading part 401 detects O3 and the despreading part 402 detects O2, the control part 405 can know the group to which the long despreading code belongs and the start timing, and therefore, sets the long spreading code belonging to that group into the despreading part 406, to search the long spreading code used by the radio base station 103 for spreading the first perch channel. Then the control part 405 sets the long spreading code D1 found by this search, into the despreading part 407. By this, it is possible to demodulate the voice data and the call control information by despreading. Here, the error correcting parts 408, 409 and 410 may be provided in case of necessity.

Figure 6:
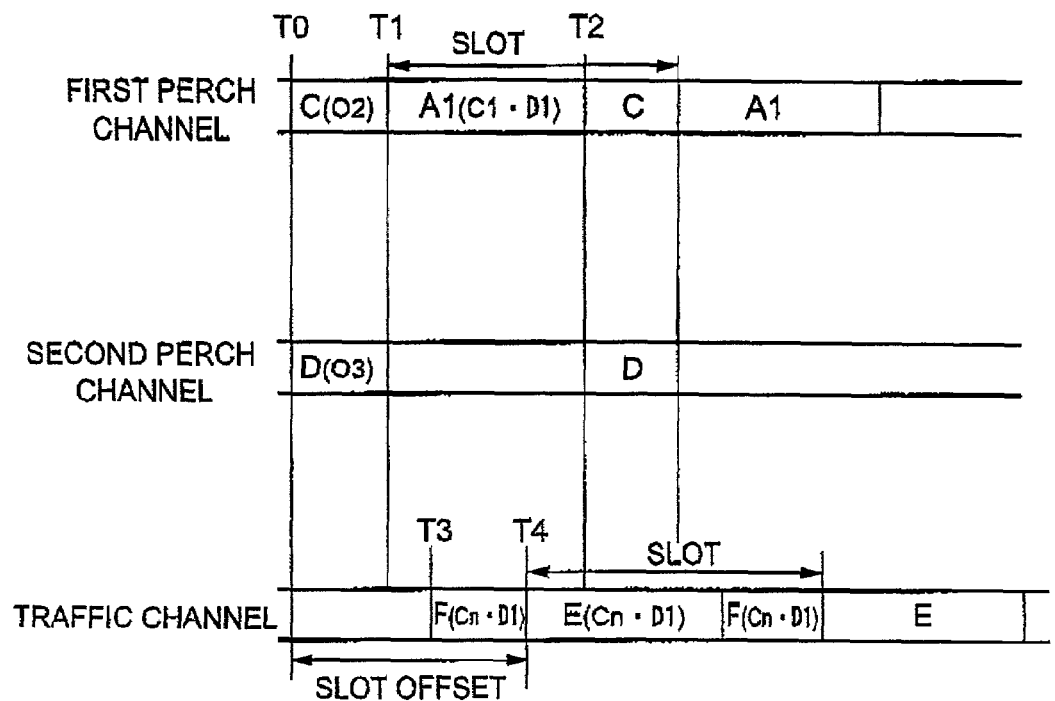
FIG. 6 is a diagram showing an example of channel arrangement according to the present invention.

FIG. 6 shows an example of structures of the perch channels and the traffic channel in the first embodiment. The main point of the first embodiment of the present invention lies in that the area C used for clarifying the send timing of the perch channel and the area D indicating the group to which the long spreading code D1 belongs, in the first and second perch channels are arranged as follows. Namely, those areas C and D, which may interfere with the essential traffic channel, are arranged not to coincide in time base with the area F for transmitting the call control information that has been subjected to time division multiplex into the traffic channel.

Namely, as shown in FIG. 6, expressing the start time of the area C of the first perch channel as T0, the time when the area C ends and the area A1 starts as T1, the time when the area A1 ends and the next area C starts as T2, the start time of the area F of the traffic channel as T3, and the time when the area F ends and the area E starts as T4, the slot offset for the traffic channel is set to satisfy the following equations;

$$T3>=T1 \quad (1)$$

$$T4<=T2 \quad (2)$$

As described above, the control part 208 of the radio base station 103 indicates the slot offset for the slot of the traffic channel to satisfy the conditions shown in the equations (1) and (2). As a result, the area F for transmitting the call control information of the traffic channel never overlaps in time base with the areas C and D of the perch channels, preventing the signals of the perch channels from interfering with the call control information.

Here, according to the above equations, the areas do not coincide with each other at all. However, the areas may overlap in some degree. In that case, the overlap may exist to the extent that corresponding errors of the call control information are allowable. When an error correction coding part (not shown) is provided to the radio base station to perform error correction on the call control information, then the area overlap is allowable to a larger extent. In the case that error correction is thus performed on the side of the radio base station 103, then, errors in the call control information owing to the area overlap can be corrected by providing the error correcting part 410 to the mobile station 104.

2. Second Embodiment

Figure 7:
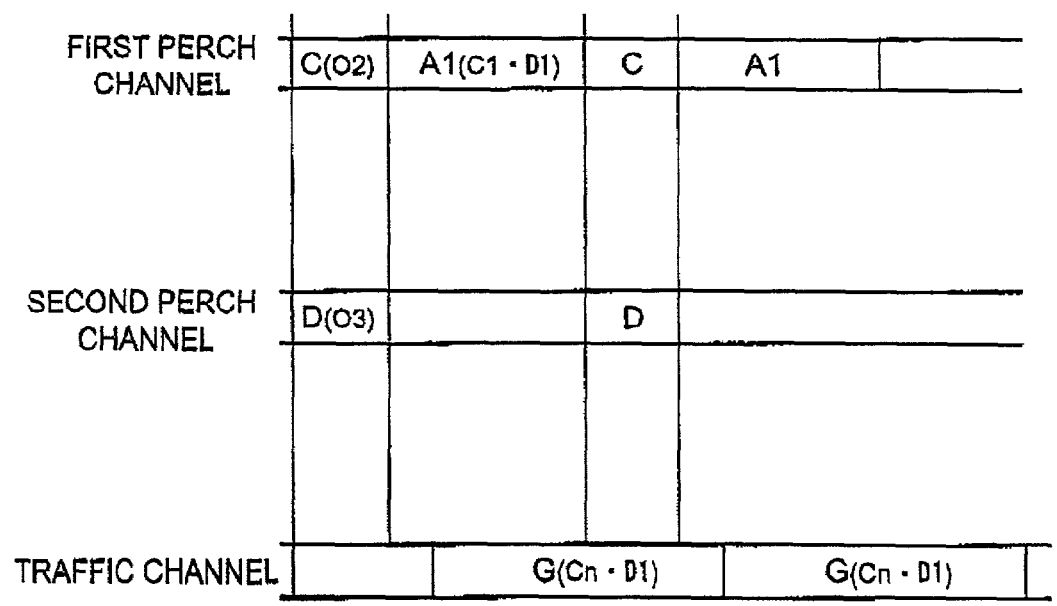
FIG. 7 is a diagram showing another example of channel structure according to the present invention.

FIG. 7 shows an example of channel structures of the perch channels and the traffic channel according to a second embodiment of the present invention.

The first and second perch channels shown in FIG. 7 according to the present invention have the same structures as the case explained referring to FIG. 10. And, the traffic channel in the second embodiment of the present invention has the structure in which each slot G is formed by multiplexing user information such as voice, data, or the like and the call control information, and thereafter being subjected to interleaving.

Figure 3:
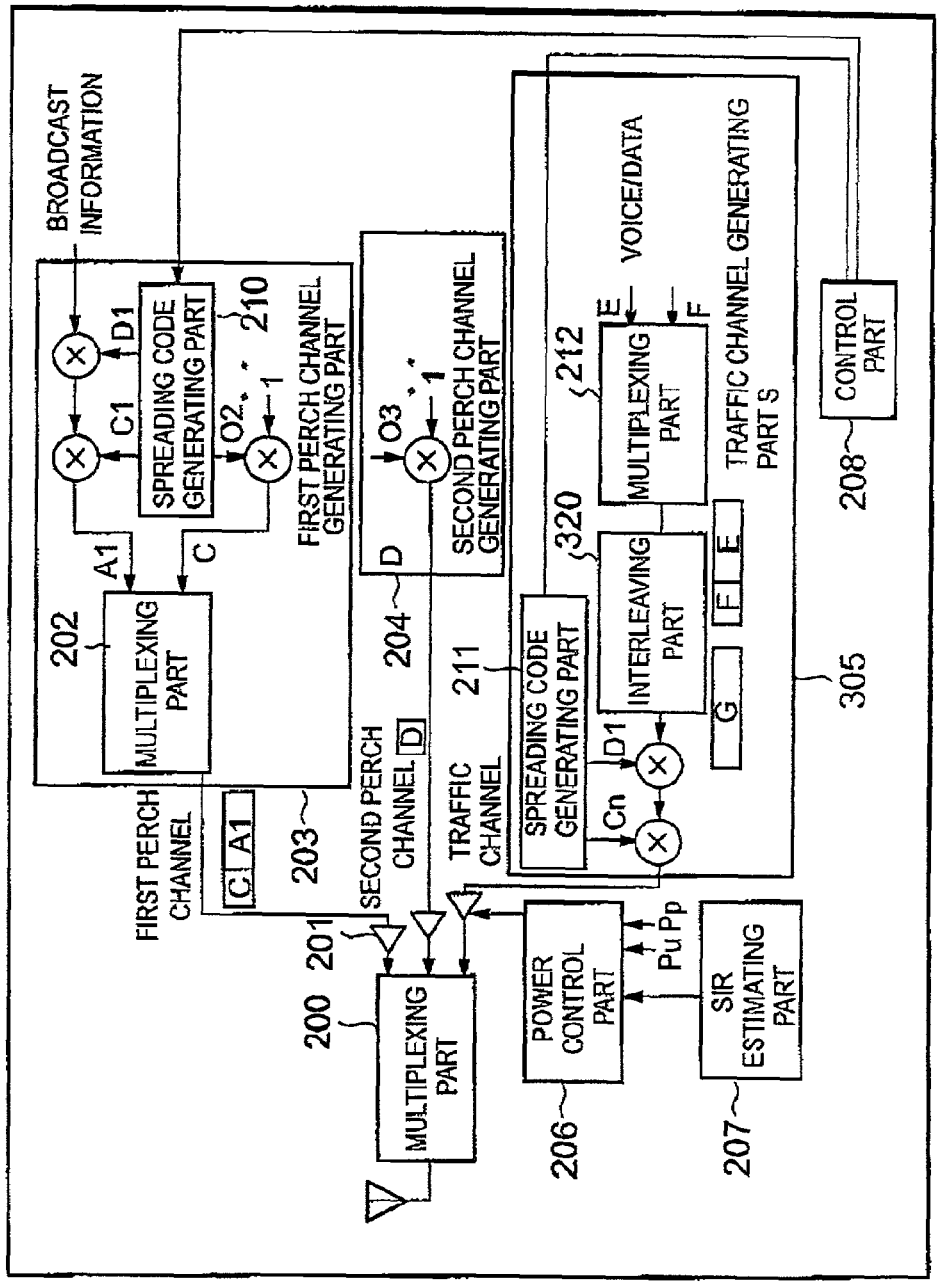
FIG. 3 is a block diagram showing another radio base station according to the present invention.

FIG. 3 shows a radio base station 113 according to the second embodiment. The main difference from FIG. 2 lies in that an interleaving part 320 is provided to the traffic channel generating part 305. The interleaving part 320 rearranges the order of the inputted call control information and voice/data or the like. Namely, the call control information, which has been arranged in a cluster, is rearranged to be scattered in time base. In comparison with the fist embodiment, interleaving leads to increase of the degree of freedom of the control part 208 to set a slot offset.

Figure 5:
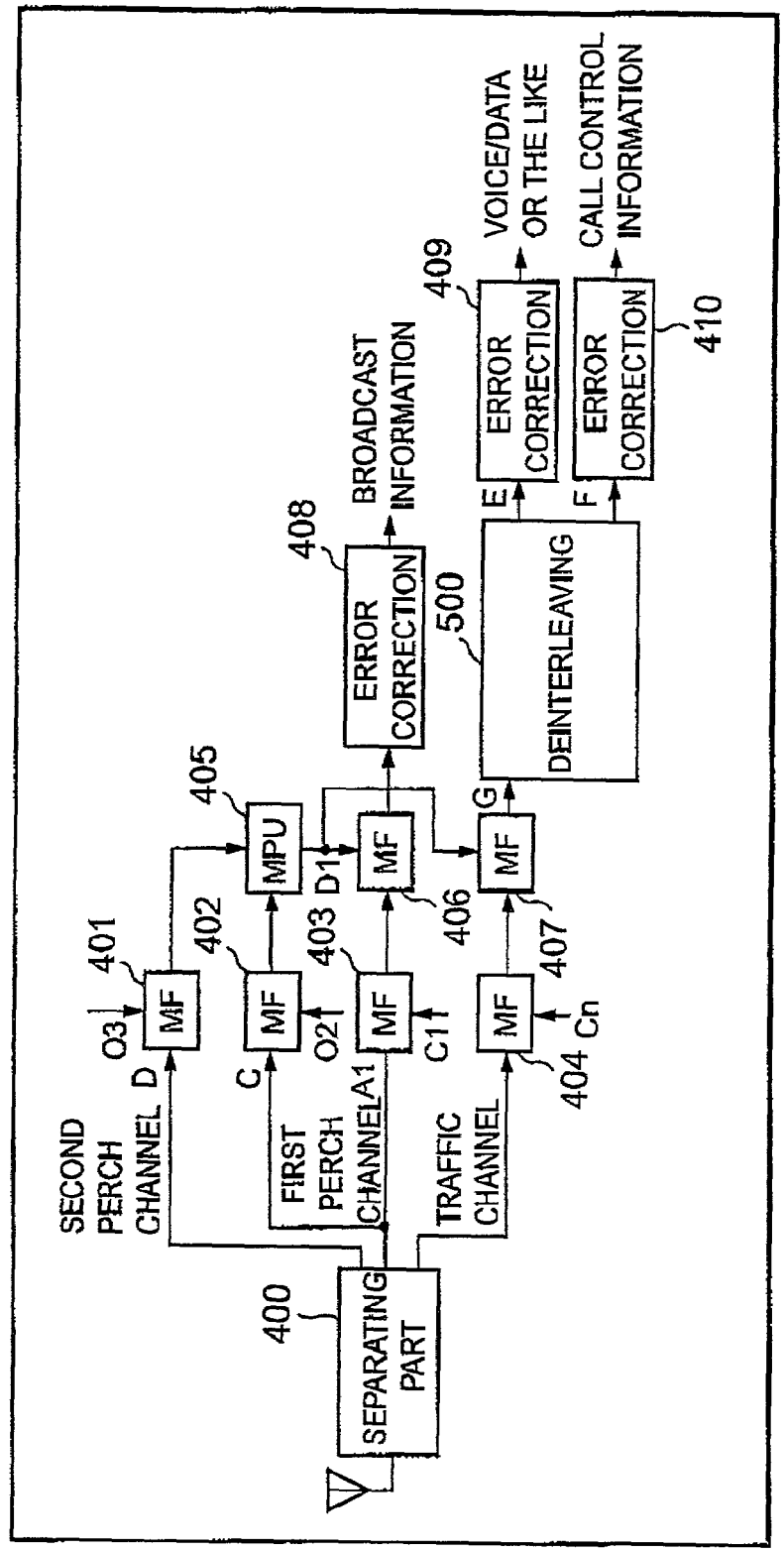
FIG. 5 is a block diagram showing another radio terminal according to the present invention.

FIG. 5 shows a mobile station 114 of the second embodiment. The main difference from FIG. 4 lies in that a deinterleaving part 500 is provided. By this, the traffic channel interleaved by the radio base station 113 can be deinterleaved, to reduce errors in the call control information caused by interference of the perch channels. As a result of interleaving, the area F of the call control information does not entirely coincide with the areas C and D of the perch channels. However, from the opposite viewpoint, those areas partly overlap with each other to a small extent. Although this overlap part causes errors, such errors of the call control information can be reduced by error correction in the error correcting parts 409 and 410.

FIG. 8 shows that, scattering of the call control information in time base by interleaving reduces interference by the area C that is not orthogonal in terms of a code. In the example of FIG. 8, three pieces of the area F after the interleaving overlap with the area C, causing errors in the parts of those pieces, while transmission can be performed without error in the parts overlapping with the area A1 that is in the orthogonal relation.

As already described, the call control information transmitted in the area F of the traffic channel of FIG. 11 has small quantity of information in comparison with the essential user information transmitted through the traffic channel, and accordingly has shorter burst width after the time division multiplex. As a result, as described referring to FIG. 11, it is possible that the area F for transmitting the call control information is entirely covered by the part shown as the area C or D of the first or second perch channel that interferes with the traffic channel, causing errors of the call control.

On the other hand, in the second embodiment shown in FIG. 7 of the present invention, each slot G of the traffic channel is formed by performing the time division multiplex on the user information such as voice, data, or the like and the call control information, and thereafter by interleaving. On the receiving side, when data of the area G is received, then, the user signal and the call control signal can be separated by deinterleave operation, to extract the given call control signal. The call control signal interleaved and scattered in the area G is widely dispersed in time base, and accordingly, a probability of error generation can be largely reduced, similarly to the user signal.

3. Third Embodiment

The above-described first and second embodiments of the present invention can prevent disturbance to the call control information and unstableness of call connection control owing to interference inevitably produced between signals multiplexed by the CDMA system and emitted from a base station.

As already described, in the case of user information such as voice, data, or the like transmitted through the traffic channel, an occasional error does not cause fatal degradation of the service. However, when user information is not voice information having a bit rate of several kbit/sec, but multimedia data or the like having a bit rate of several hundreds kbit/sec, a ratio to the spread rate (chip rate) becomes smaller, and accordingly a so-called spread gain decreases and resistance to interference with the traffic channel becomes lower.

Thus, in the first and second embodiment of the present invention described referring to FIGS. 6 and 7, it is possible that interference of the area C or D of the perch channel with user data on the traffic channel may become remarkable. To avoid such a situation, it is necessary to make the transmit power of the traffic channel not so lowered than the transmit power of the perch channel.

Thus, the power control part 207 performs power control of the traffic channel according to the following method. Namely, a base station is constructed such that the transmit powers of the perch channels and the traffic channel are controlled to satisfy the following equation:

$$Pu \geq Pp+SIRr-Gd \qquad (3)$$

where Pp is a value obtained by adding the powers of the area C and the area D of the perch channels, Pu is the transmit power of the traffic channel transmitted from the base station, SIRr is a signal to interference power ratio required for receiving the traffic channel without an error, and Gd=10 log (spread rate/bit rate of the traffic channel) is a spread gain of the traffic channel. Namely, the minimum transmit power of the traffic channel is changed in accordance with the bit rate of user data transmitted through the traffic channel.

As described above, the present invention can reduce interference of the perch channels with the call control information or the traffic channel in the mobile station side.

What is claimed is:

1. A method of mobile communication using a CDMA multiplex technique, in which a base station communicates with a mobile station through a traffic channel for transmitting user data and through a perch channel for transmitting a spreading code used for demodulating the user data,
   wherein said traffic channel has a call control channel subjected to time division multiplex,
   wherein said call control channel and a part, that is provided in said perch channel and does not have orthogonality to other channels, are arranged not to overlap with each other in a time base, and
   wherein said base station controls transmit powers of the perch channel and traffic channel to satisfy:

$$Pu \geq Pp+SIRr-Gd$$

where Pu is a transmit power of said traffic channel, Pp is a transmit power of said perch channel, SIRr is a signal to interference power ratio required for receiving the traffic channel without an error, and Gd=10 log (spread rate/bit rate of the traffic channel) is a spread gain of the traffic channel.

2. A method of mobile communication using a CDMA multiplex technique, in which a base station communicates with a mobile station through a traffic channel for transmitting user data and through a perch channel for transmitting a spreading code used for demodulating the user data,
   wherein said traffic channel is constructed such that said traffic channel has a call control channel subjected to time division multiplex, and a signal of said call control channel and the user data are subjected to time division multiplex and interleaving, and
   wherein said base station controls a transmit power of the traffic channel to satisfy:

$$Pu \geq Pp+SIRr-Gd$$

where Pu is the transmit power of said traffic channel, Pp is a transmit power of said perch channel, SIRr is a signal to interference power ratio required for receiving the traffic channel without an error, and Gd=10 log (spread rate/bit rate of the traffic channel) is a spread gain of the traffic channel.

3. A communication apparatus, comprising:
   a control information generating part for generating control information common to a plurality of radio terminal;
   a first spreading part for spreading said control information with a first spreading code D1;
   a second spreading part for spreading a first specific information with a second spreading code O2 related to a start timing of said first spreading code;
   a third spreading part for spreading the control information, which has been spread by said first spreading part, with a third spreading code C1;
   a first perch channel generating part for generating a first perch channel by performing time division multiplex with respect to the control information spread by said third spreading part and the specific information spread by said second spreading part;
   a fourth spreading part for spreading a second specific information with a fourth spreading code O3 related to a group to which said first spreading code belongs;
   a second perch channel generating part for generating a second perch channel by synchronizing the second specific information spread with the fourth spreading code O3 with said first specific information of said first perch channel;
   an input part for inputting voice or data;
   a multiplexing part for performing time division multiplex with respect to said voice or data and call control information;
   a fifth spreading part for spreading said voice or data and call control information subjected to the time division multiplex, using said first spreading code D1;
   a sixth spreading part for spreading said voice or data and call control information, which have been subjected to spreading by said fifth spreading part, using a fifth spreading code CN orthogonal to said third spreading code in terms of a code;
   a traffic channel generating part for generating a traffic channel including said voice or data and call control information spread with said fifth spreading code; and
   a control part for controlling slot offsets of said first perch channel and said traffic channel, such that said first specific information of the first perch channel and said call control information of the traffic channel, generally, do not overlap with each other in a time base.

4. The communication apparatus according to claim 3, further comprising:
   a transmit power control part for controlling a transmit power of said traffic channel, instead of said control part or in addition to said control part.

5. The communication apparatus according to claim 3, further comprising:
   an error correction coding part for performing error correction coding on said call control information or on said voice or data and said call control information, before spreading using said fifth spreading code CN.

6. The communication apparatus according to claim 4, further comprising:
   an error correction coding part for performing error correction coding on said call control information or on said voice or data and said call control information, before spreading using said fifth spreading code CN.

7. A communication apparatus, comprising:
   a control information generating part for generating control information common to a plurality of radio terminal;

a first spreading part for spreading said control information with a first spreading code D1;
a second spreading part for spreading a first specific information with a second spreading code O2 related to a start timing of said first spreading code;
a third spreading part for spreading the control information, which has been spread by said first spreading part, with a third spreading code C1;
a first perch channel generating part for generating a first perch channel by performing time division multiplex with respect to the control information spread by said third spreading part and the specific information spread by said second spreading part;
a fourth spreading part for spreading a second specific information with a fourth spreading code O3 related to a group to which said first spreading code belongs;
a second perch channel generating part for generating a second perch channel by synchronizing the second specific information spread with the fourth spreading code O3 with said first specific information of said first perch channel;
an input part for inputting voice or data;
a multiplexing part for performing time division multiplex with respect to said voice or data and the call control information;
an interleaving part for interleaving said voice or data and call control information subjected to said time division multiplex;
a fifth spreading part for spreading said voice or data and call control information subjected to interleaving, using said first spreading code D1;
a sixth spreading part for spreading said voice or data and call control information, which have been subjected to spreading by said fifth spreading part, using a fifth spreading code CN orthogonal to said third spreading code in terms of a code; and
a traffic channel generating part for generating a traffic channel including said voice or data and call control information spread with said fifth spreading code.

8. The communication apparatus according to claim 7, further comprising:
an error correction coding part for performing error correction coding on said call control information or on said voice or data and said call control information, before the interleaving.

9. A CDMA mobile communication system comprising a plurality of mobile stations and a radio base station communicating with said mobile stations, wherein:
said radio base station comprises:
a control information generating part for generating control information common to said plurality of mobile stations;
a first spreading part for spreading said control information with a first spreading code D1;
a second spreading part for spreading a first specific information with a second spreading code O2 related to a start timing of said first spreading code;
a third spreading part for spreading the control information, which has been spread by said first spreading part, with a third spreading code C1;

a first perch channel generating part for generating a first perch channel by performing time division multiplex with respect to the control information spread by said third spreading part and the specific information spread by said second spreading part;
a fourth spreading part for spreading a second specific information with a fourth spreading code O3 related to a group to which said first spreading code belongs;
a second perch channel generating part for generating a second perch channel by synchronizing the second specific information spread with the fourth spreading code O3 with said first specific information of said first perch channel;
an input part for inputting voice or data;
a multiplexing part for performing time division multiplex with respect to said voice or data and call control information;
a fifth spreading part for spreading said voice or data and call control information subjected to the time division multiplex, using said first spreading code D1;
a sixth spreading part for spreading said voice or data and call control information, which have been subjected to spreading by said fifth spreading part, using a fifth spreading code CN orthogonal to said third spreading code in terms of a code;
a traffic channel generating part for generating a traffic channel including said voice or data and call control information spread with said fifth spreading code CN;
a control part for controlling slot offsets of said first perch channel and said traffic channel, such that said first specific information of the first perch channel and said call control information of the traffic channel, generally, do not overlap with each other in a time base; and
a transmitting part for transmitting said first perch channel, said second perch channel, and said traffic channel;
each of said mobile stations comprises:
a receiving part for receiving said first perch channel, said second perch channel, and said traffic channel;
a first extracting part for extracting said second spreading code O2 from the first perch channel received by said receiving part;
a second extracting part for extracting said fourth spreading code O3 from the second perch channel received by said receiving part;
a third extracting part for extracting said first spreading code based on said second spreading code and said fourth spreading code;
a broadcast information demodulating part for demodulating broadcast information by performing despreading demodulation on said second perch channel using said first spreading code extracted by said third extracting part and said third spreading code C1; and
a call control information demodulating part for demodulating the call control information by performing despreading demodulation on said traffic channel using said first spreading code extracted by said third extracting part and said fifth spreading code CN.

* * * * *